May 15, 1934. N. POPOVICH 1,958,861
EYE SET FOR DOLLS
Filed May 16, 1933
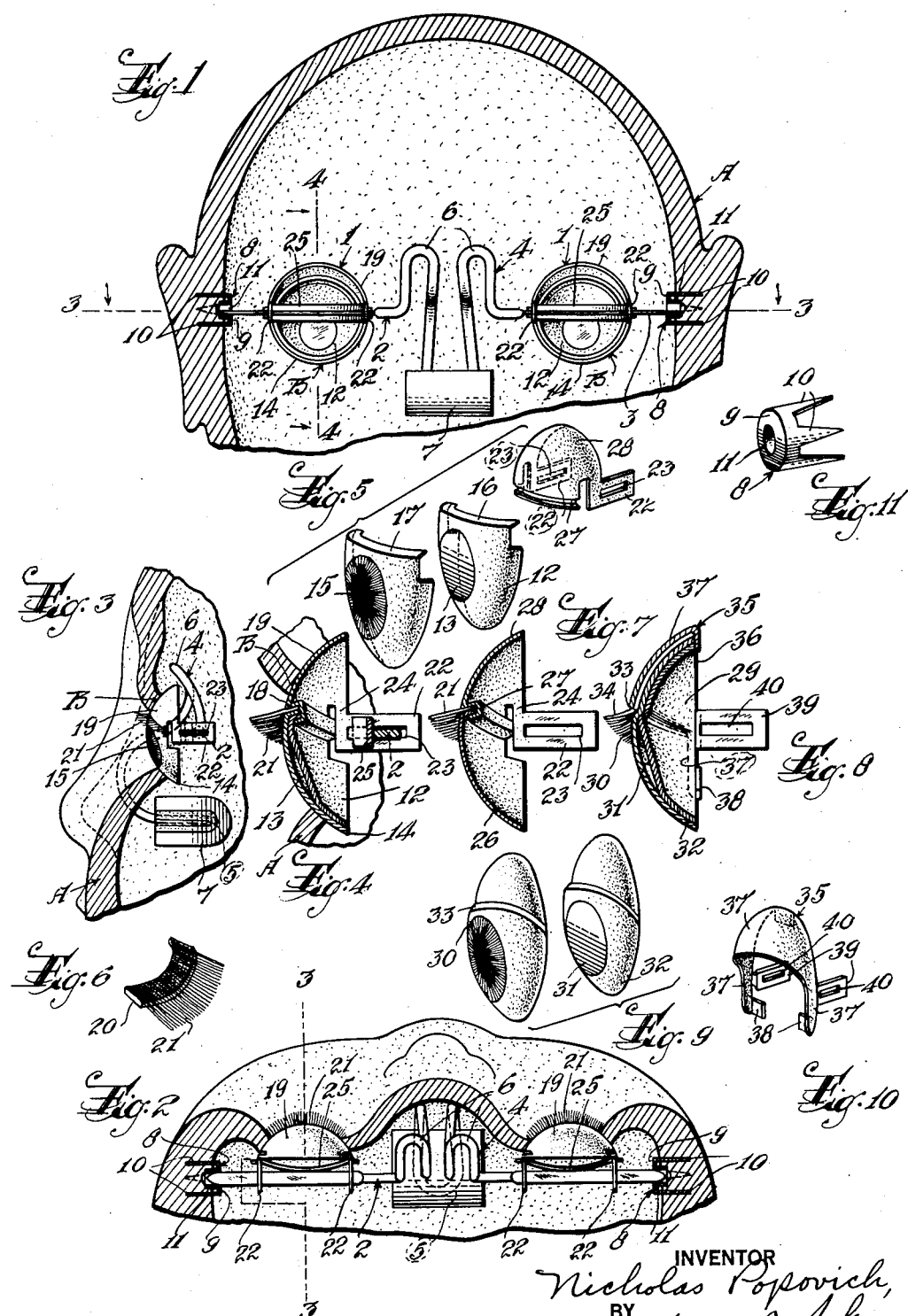

Patented May 15, 1934

1,958,861

UNITED STATES PATENT OFFICE 1,958,861

EYE SET FOR DOLLS

Nicholas Popovich, Teaneck, N. J., assignor of one-third to Joseph A. Taferner and one-third to Leo J. Schlitzer, both of New York, N. Y.

Application May 16, 1933, Serial No. 671,321

6 Claims. (Cl. 46—40)

This invention relates in general to eye sets for dolls and artificial figures, including eye members which are mounted within the head of a doll or the like to rotate in eye openings or sockets and simulate natural movement of the eyes as in opening and closing thereof. More particularly the invention relates to eye sets of this character which comprise a pair of eye members mounted on a yoke which is directly rotatably mounted in the doll head to hold and rotate the eye members in the eye sockets.

Among the objects of my invention are to provide an eye set of this character embodying novel and improved features of construction including a yoke having axially alined end portions to rotatably fit sockets or bearings in opposite side walls of a doll head, said axially alined portions being connected by an intermediate resilient, extensible and contractible section, whereby said end portions can be drawn axially toward each other to shorten or reduce the length of the yoke while inserting the yoke in a doll head, and said end portions may be resiliently projected or inserted into said bearing sockets; and to provide such a yoke formed of a single piece of resilient wire having axially alined end portions and an intermediate looped portion so that upon compression and release of the loops, the end portions can be drawn together and projected into bearing sockets respectively.

Further objects are to provide in such an eye set a pair of novel and improved bearing members to be secured in the walls of a doll head, and having openings to rotatably receive the end portions of an eye member supporting yoke; and to provide such bearing members in the form of annular bodies having prongs projecting from the peripheries thereof perpendicular to the planes of said bodies, whereby the prongs can be driven into the doll head and the openings in the bodies serve as bearings for a yoke.

Further objects are to provide novel and improved eye members and means for mounting them on a yoke, whereby the eye members may freely slide longitudinally of the yoke and are yieldingly influenced into the eye sockets, so that the eye members can automatically adjust themselves to the eye sockets to compensate for inaccuracies or irregularities in the relation of the eye sockets to each other and the yoke; and thus to provide the eye members with diametrically opposite ears having alined slots to slidably receive the yoke so that the eye members may move relatively to the yoke in a plurality of directions, and leaf springs interposed between said yoke and said eye members to yieldingly hold the eye members in frictional engagement with the yoke and influence the eye members laterally relatively to the yoke.

Other objects are to provide a novel and improved eye member having eyelashes and comprising two complemental sections each constituting a segment of a hollow sphere less than a hemisphere and one having a representation of a pupil and iris of the eye, said sections being connected at their edges and having eyelashes secured in the joint between said sections so that said lashes project outwardly from said eye member in close simulation of a natural eye and lashes; and to provide an eye member formed of ductile or bendable material in the shape of substantially a hollow hemisphere and having integral diametrically opposite ears projecting therefrom perpendicularly to the chordal plane of the hemisphere for connection to a yoke, said ears being movable in their own planes for adjusting the eye members on the yoke relatively to eye sockets.

Further objects are to provide an eye member comprising a hollow hemisphere having a transverse shoulder on its spherical surface and eyelashes overlying said shoulder, and means for holding said eyelashes tight against the shoulder, whereby the ends of said lashes are deflected by said shoulder outwardly from said spherical surface to closely simulate a natural eye and lashes; to provide an eye member comprising a hemispherical hollow body having a flat chordal plane surface, and a transparent hollow hemispherical cover on said body having a representation of a pupil and an iris in juxtaposition to said chordal plane surface, so as to suggest depth in the iris in close simulation of a natural eye.

Other objects are to provide a simple and inexpensive, reliable and durable eye set; and to obtain other advantages and results of the invention as will appear from the following description.

Referring to the accompanying drawing in which corresponding and like parts are designated by the same reference characters, Figure 1 is a rear elevation of an eyeset embodying my invention showing it applied to a doll head which is illustrated in vertical section.

Figure 2 is a horizontal sectional view on the line 2—2 of Figure 1.

Figure 3 is a transverse vertical sectional view on the line 3—3 of Figure 2.

Figure 4 is a transverse vertical sectional view on the line 4—4 of Figure 1.

Figure 5 is a composite perspective view of the parts of the eye member shown in Figure 4.

Figure 6 is a perspective view of the eyelashes shown in Figure 4.

Figures 7 and 8 are transverse vertical sectional views through eye members showing modifications of the invention.

Figure 9 is a composite perspective view of the parts of the eye member shown in Figure 8.

Figure 10 is a perspective view of the clip for the eye member shown in Figure 8, and Figure 11 is a detached perspective view of one of the bearing members for the yoke.

Specifically describing the illustrated embodiment of the invention the reference character A designates a doll head of known construction formed of penetrable material and having eye sockets B in the face portion thereof. An eye member 1 is rotatable in each of the eye sockets B to simulate opening and closing of the eyes, said eye members being mounted on a yoke 2 which is rotatably mounted in the doll head.

The yoke 2 is shown as comprising a single piece of spring wire having end portions 3 in axial alinement with each other and connected by an intermediate resilient portion 4 whereby the end portions 3 can be drawn inwardly toward each other to shorten the yoke and will spring away from each other to lengthen the yoke. The resilient portion 4 is shown as formed by a main loop 5 at the center of the wire and a pair of auxiliary loops 6, one at each side of the main loop 5. The loop 5 projects a considerable distance laterally beyond the axis of the end portions 3 and has a counterweight 7 connected thereto, so that said loop and counterweight serve as a pendulum.

For mounting the yoke in a doll head, I utilize a pair of bearing members 8, each of which is shown as comprising a circular or annular body 9 having integral prongs 10 projecting therefrom at an angle to the plane of the body to be driven into the walls of a doll head. The central openings 11 in the bearing members form bearings for the end portions 3 of the yoke.

In mounting the eye set in a head, the bearing members 8 are first driven into the opposite side walls of the head adjacent the eye sockets B and approximately equidistantly therefrom. The yoke is normally of a length so that its extremities are spaced apart a distance greater than the annular bodies 9 of the bearing members, and the loops 4 are then clasped between the thumb and forefinger of the hand of the operator and compressed so as to shorten the yoke, after which the ends of the yoke are brought into alinement with the openings 11 in the bearing members, whereupon the extension and the inherent resiliency of the loops causes the end portions 3 of the yoke to be projected into the bearing openings 11 as shown in Figure 1. To remove the yoke from the head it is merely necessary to clasp the loops 6 and compress them so as to withdraw the end portions of the yoke from the bearing members.

The end portions 3 of the yoke are flattened and slidably receive the eye members 1. Each eye member is shown as including a segment 12 of a hollow sphere which is less than a hemisphere and has a flat chordal plane surface 13. The surface 13 may be of any suitable color corresponding to that of the iris of an eye, while the remainder of the spherical section of the surface 12 will preferably be white. Another segment 14 of a hollow sphere formed of transparent material, for example, celluloid, is applied over the section 12 and has the respresentation of a pupil and iris of an eye as indicated at 15. The two sections 12 and 14 are arranged so that the representation 15 of the iris is in juxtaposition to the plane surface 13 of the section 12, whereby depth in the iris is suggested in close simulation of the natural eye. The sections 12 and 14 have at one edge corresponding flanges 16 and 17 which are clamped in a groove 18 in another section 19 which is also a segment of a hollow sphere and complemental to the section 14 in forming substantially a hemisphere. The groove 18 is formed integral with the section 19 which is preferably of sheet metal, and the flanges 16 and 17 can be clamped in the groove by squeezing the walls of the groove together. This joint preferably extends horizontally transversely of the eye member above the representation 15 of the iris so as to simulate the edge of an eyelid, and serves as a highly convenient means of connecting eyelashes to the eye member. As shown, the eyelashes consist of a strip 20 of suitable material, for example tape, having hairs 21 glued or otherwise secured thereto. The strip 20 is curved longitudinally corresponding to the curvature of the eye member and is clamped in the groove 18 as clearly shown in Figure 4 of the drawing. With this construction, the hairs or lashes 33 are caused to project outwardly from the eye member in close simulation of natural lashes. This avoids the necessity of moulding or shaping the lashes as shown in Figure 7 and greatly reduces the possibility of the lashes following the contour of the spherical surface in such a way as to conceal the representation of the iris.

For attaching the eye member to the yoke, diametrically opposite ears 22 are formed integrally with the section 19 of the eye member and have horizontal slots 23 to receive the end portions 3 of the yoke. These ears are connected to the section 19 by reduced neck portions 24 whereby the ears can be moved in their own planes relatively to the eye member so as to adjust the eye member relatively to the yoke to compensate for irregularities in the relation of the eye sockets to each other and to the yoke.

For yieldingly influencing the eye members into the sockets B, leaf springs 25 are interposed between the eye members and the end portions of the yokes, said leaf springs having their ends reduced and slidable in the slots 23 and having their intermediate portions bowed so as to normally influence the eye members laterally of the yoke. With this mounting of the eye members on the yoke, the eye members may move relatively to the yoke in a plurality of directions and the springs 25 yieldingly frictionally hold the eye members in adjusted positions on the yoke.

A modification of the eye member is shown in Figure 7 where the section 12 is omitted and the section 14 is substituted by a correspondingly shaped section 26 of suitable material, for example, metal. The section 26 has a flange 27 which is connected to the section 28 exactly as the section 13 is connected to the section 19 in the construction shown in Figure 4.

A further modification is shown in Figures 8 to 10 of the drawings where the eye member includes a section 29 formed of suitable material such as metal. This section is approximately a hollow hemisphere and has a transverse shoulder 30 which may be formed by making two portions of the surface of the section in different curved planes. This section may also have a flat surface 31 corresponding to the surface 13 of the construction shown in Figure 4, and may be covered by a transparent section 32 corresponding to the section 14 shown in Figure 4. The section 32 also has a shoulder 33 corresponding to and fitting the shoulder 30, and eyelashes 34 are applied to the section 32 in overlying relation to the shoulder 30 so that the ends of the lashes are deflected outwardly from the eye member in close simulation of natural eyelashes.

For mounting this eye member upon the yoke, I have shown a spring clip 35 which embraces and surrounds the edges of the chordal plane surface 36 of the eye member a distance substantially greater than one half the circumference of said surface. This spring clip has a flange 37 which overlies the spherical surface of the eye member, and said flange may be extended into a segmental portion 37 overlying the lashes 34 to simulate an eyelid. Lugs 38 at the ends of the clip and at approximately the central portion thereof extend inwardly and overlie the chordal plane edges of the eye member. The eye member is thus securely removably held in the spring clip, and the clip has diametrically opposite ears 39 projecting perpendicularly to the chordal plane surface of the eye member and formed with slots 40 to slidably receive the flattened end portions of the yoke, whereby the eye members may slide longitudinally of the yoke.

Obviously, the eye member might be formed of one piece of material, such as metal, having a shoulder corresponding to the shoulders 30 or 33, or the eye member might be formed of a hemisphere of glass having a suitable representation of an iris.

While I have shown and described the invention as embodied in certain details of construction it should be understood that this is primarily for the purpose of illustrating the principles of the invention and that many modifications and changes may be made in the details of construction without departing from the spirit of my invention.

Having thus described my invention, what I claim is:

1. In an eye set, a pair of eye members, and a yoke therefor formed of a single length of resilient wire having axially alined end portions to enter bearing sockets in a doll head and a laterally extending loop intermediate said ends offset from the axis of said end portions, and a counterweight rigidly connected to said loop whereby said loop and counterweight will serve as a pendulum for rotating said yoke when said end portions of the yoke are mounted in bearing sockets in a doll head.

2. The combination with a doll head formed of penetrable material and having eye sockets, of an eye member in each of said sockets, a yoke for supporting and rotating said eye members and having axially alined end portions each having one eye member mounted thereon for rotation therewith, and bearing sockets in the walls of said doll head adjacent said eye sockets, said yoke normally being of a length greater than the distance between said bearing sockets and having a resilient contractible and extensible intermediate portion connecting said end portions, whereby said yoke can be contracted to cause said end portions to enter said bearing sockets and will resiliently extend itself after contraction to hold said end portions in said sockets.

3. In an eye set, a pair of eye members, and a yoke therefor formed of a single piece of resilient wire having axially alined end portions to enter bearing sockets in a doll head, said piece of wire having a main laterally projecting loop at its middle offset from the axis of said end portions and an auxiliary loop at each side of the main loop projecting laterally oppositively to said main loop, and a counterweight on said main loop, whereby said auxiliary loops serve as finger holds for handling said yoke and upon compression of said loops said yoke is shortened while upon release of said loops said yoke will extend itself to its original length, said main loop and said counterweight serving as a pendulum for rotating the yoke when said end portions of the yoke are mounted in bearing sockets in a doll head.

4. In an eye set, a yoke for supporting members, eye members each having a pair of diametrically opposite ears formed with axially alined openings slidably receiving said yoke to permit the eye members to move laterally and longitudinally of the yoke, and a bowed spring strip having its ends in said openings of each eye member and its intermediate portion interposed between said eye member and the yoke to frictionally hold the eye member on the yoke and influence the eye member laterally of the yoke.

5. An eye member comprising a pair of complemental sections each constituting a segment of a hollow sphere, one section having a groove at one edge and the other section having an integral flange at one edge directly clamped in said groove, and eyelashes secured in said groove between said sections, whereby the sections are secured together to form a larger spherical segment with said eyelashes directly clamped between said sections.

6. In an eye set a yoke rod having a polygonal end portion, an eye member comprising a segment of a hollow sphere having diametrically opposite ears projecting integrally from said segment perpendicularly to the chordal plane surface of said segment, each ear having a polygonal opening to receive said polygonal end portion of said yoke rod so that said eye member will rotate with said rod, each ear being connected at one end to said segment by a reduced neck whereby said ears can be adjusted in their own planes relatively to said segment by bending said reduced necks to adjust the eye member angularly relatively to said yoke rod.

NICHOLAS POPOVICH.